United States Patent [19]

Wilkinson

[11] Patent Number: 4,821,137
[45] Date of Patent: Apr. 11, 1989

[54] POSITIVE SEQUENCE DISTANCE RELAY FOR AC POWER TRANSMISSION LINE PROTECTION

[75] Inventor: Stanley B. Wilkinson, Havertown, Pa.

[73] Assignee: General Electric Company, King of Prussia, Pa.

[21] Appl. No.: 120,115

[22] Filed: Nov. 12, 1987

[51] Int. Cl.$^4$ .............................................. H02H 3/26
[52] U.S. Cl. ...................................... 361/80; 361/76; 361/82
[58] Field of Search ...................... 361/76, 77, 82, 67, 361/79, 80, 84–87

[56] References Cited

U.S. PATENT DOCUMENTS

| | | | |
|---|---|---|---|
| 4,329,727 | 5/1982 | Premerlani | 361/80 |
| 4,420,788 | 12/1983 | Wilkinson et al. | 361/80 X |
| 4,453,191 | 6/1984 | Wilkinson | 361/84 |
| 4,686,601 | 8/1987 | Alexander et al. | 361/82 X |

*Primary Examiner*—Todd E. Deboer
*Attorney, Agent, or Firm*—Henry J. Policinski; William H. Murray

[57] ABSTRACT

A protective relay for detecting faults within a predetermined protected zone of a three phase alternating current electrical power distribution system generates a polarizing signal $V_{POL}$ which includes a signal $V_1$ related to a positive sequence component of a phase voltage of the three phase power distribution system. A signal $I_1Z_R$, which is a signal related to a positive sequence component of a phase current of the three phase power distribution system multiplied by a replica impedance of the protected zone of the three phase power distribution system, is also generated. The coincidence of the $V_{POL}$ and $I_1Z_R$ signals are compared and an operate signal is generated as a result of positive coincidence. A first restraint signal is generated as a result of negative coincidence. A second restraint signal related to $V_1$ is also generated. A net operating signal is generated when the magnitude of the operate signal exceeds the sum of the magnitude of the first restraint signal and the second restraint signal.

13 Claims, 4 Drawing Sheets

POSITIVE SEQUENCE DISTANCE RELAY FOR AC POWER TRANSMISSION LINE PROTECTION

BACKGROUND OF THE INVENTION

The present invention relates to protective relay circuits for use in AC power distribution systems and more particularly to distance relays for transmission line protection.

Distance relays are well known in the art of protective relaying. For example, reference may be had to "The Art and Science of Protective Relaying", Mason, published by John Wiley & Son, Inc. (1956), particularly to chapter 14. Prior art distance relays include those which employ a phase comparator method of measurement. Exemplary circuits for phase comparator distance relays are disclosed in U.S. Pat. No. 4,034,269, issued to S. B. Wilkinson, the inventor of the present invention, on July 5, 1977; and U.S. Pat. No. 4,420,788, issued to S. B. Wilkinson and G. E. Alexander on Dec. 13, 1983. Both of these patents are assigned to the assignee of the present invention and are incorporated by reference into the present application as if fully set forth herein.

Positive sequence distance relays are utilized in protective systems for AC power transmission lines to detect three phase faults within a protected zone or portion of the transmission line. If such a fault is detected within the relay's zone or reach, the positive sequence distance relay will cause the operation of a three pole circuit breaker to trip all three phases of the transmission line. This is to be contrasted with a ground relay which defects faults between a phase and ground, again within a designated zone or reach; and, upon detection of such a fault, generates a signal which may operate a circuit breaker to trip the faulted phase only.

As indicated above, each particular positive sequence distance relay should only detect faults within its protected zone or reach. The parameters of a distance relay are commonly selected to correspond to the parameters of the transmission line. For example, the parameters are selected to provide a forward reach that may correspond to the forward distance of the zone of the transmission line under protection of the particular relay. It is desired that the distance relay operate within its selected forward reach thereby confining the protection of a particular distance relay to a selected zone within a protected system.

The desired operation of the distance relay may be hindered by the inability to distinguish between internal and external faults. Internal faults are those which occur within the protected zone or reach of the relay, whereas external faults are those that occur outside the zone or relay reach. For example, transients generated by capacitive voltage transformers or series capacitors in series compensated lines, often cause external faults to appear as internal faults to a distance relay.

In the past, many distance relays have employed phase angle comparator circuits. In some cases, these relays have employed amplitude comparators as well as phase angle comparators. In phase angle comparators, the characteristic is typically developed by measuring the angle between an operating signal, for example $V_{OP} = IZ - V$, and a polarizing signal, $V_{POL}$. This measurement may be accomplished by use of a coincidence logic circuit and a characteristic timer; see, for example, the above referenced U.S. Pat. No. 4,034,269. For the simplest phase angle comparator, the operating time is a function of the phase angle between $V_{OP}$ and $V_{POL}$ and the fault incident angle rather than the severity of the fault (i.e., the magnitude of the operating signal). Consequently, a fault just in front of the relay and a fault at a remote location (for example, 90% of the relay reach), would produce the same steady state timer input blocks of approximately one half cycle even though the operating signal for the close-in fault is much larger than that for the remote fault.

In the case of a fault just beyond the reach of the relay, the operating and polarizing signals are 180% out of phase and therefore produce no input to the characteristic timer. In addition, the magnitude of the operating signal is very small; therefore any errors in the operating signal, such as those caused by capacitive coupled voltage transformer errors, may cause the operating signal to reverse thus producing an undesirable operation of the measuring unit. In order to prevent such an overreach condition in a zone 1 relay, the operate signal must be sufficiently filtered to remove erroneous signals or the reach must be reduced.

Amplitude comparators have typically been used in negative sequence distance units and restrained overcurrent units. In this design, the minimum operating time is also determined by the setting of the characteristic timer as it is in the phase angle comparator design. However, even though this function operates on a comparison of signal magnitude, the speed of operation is not directly related to the fault severity. In this regard, the amplitude comparator circuit is similar to the phase angle comparator implementation.

Accordingly, it is an object of the present invention to provide a distance relay for detecting three phase faults in a protected zone of AC power transmission line which relay has an operating time which is based upon fault severity.

It is another object of the present invention to provide a distance relay which operates more quickly for a close-in fault as compared to a remote end fault in a protected zone of an AC power transmission line.

It is yet another object of the present invention to provide a distance relay with improved discrimination between internal and external faults thereby increasing the reliability of relay operation and the security of the protection system.

It is a further object of the present invention to provide a distance relay having improved discrimination between internal and external faults on series capacitive compensated AC power transmission lines.

It is still another object of the present invention to provide a distance relay having improved discrimination between internal three phase faults and close-in internal single line to ground faults for improved phase selection in single pole tripping schemes.

These and other objects of the present invention will become apparent to those skilled in the art upon consideration of the following description of the invention.

SUMMARY OF THE INVENTION

The present invention comprises a positive sequence distance relay whose main purpose is to detect three phase faults within a predetermined protected zone of a three phase AC electrical power transmission line. The positive sequence distance relay includes an energy comparator comprising an integrator circuit and a level detector circuit. The output of the integrator circuit varies as a function of the magnitude of the difference between operate and restraint signals, which provides an operating time based on fault severity. The output of the integrator circuit is coupled to the input of the level detector circuit which generates an output signal when the input signal magnitude exceeds a predetermined trip level. A close-in fault, as compared to a remote end fault, produces a larger signal to drive the integrator circuit output more quickly to the trip level.

The positive sequence distance relay of the present invention preferably utilizes an operate signal determined by the positive coincidence of a polarizing signal ($V_{POL}$) and the positive sequence component of the phase current ($I_1$) multiplied by the replica impedance of the protective zone of the transmission line ($Z_R$). The negative coincidence of $V_{POL}$ and $I_1 Z_R$ is utilized to determine one restraint and the positive sequence component of the voltage ($V_1$) is utilized as a second restraint.

The features of the invention believed to be novel are set forth particularly in the appended claims. The invention itself, however, both as to its organization and operation, together with further objects and advantages thereof, may best be understood by reference to the following description in conjunction with the accompanying drawing figures.

DETAILED DESCRIPTION OF THE PREFERRED EMBODIMENT

Figure 1:
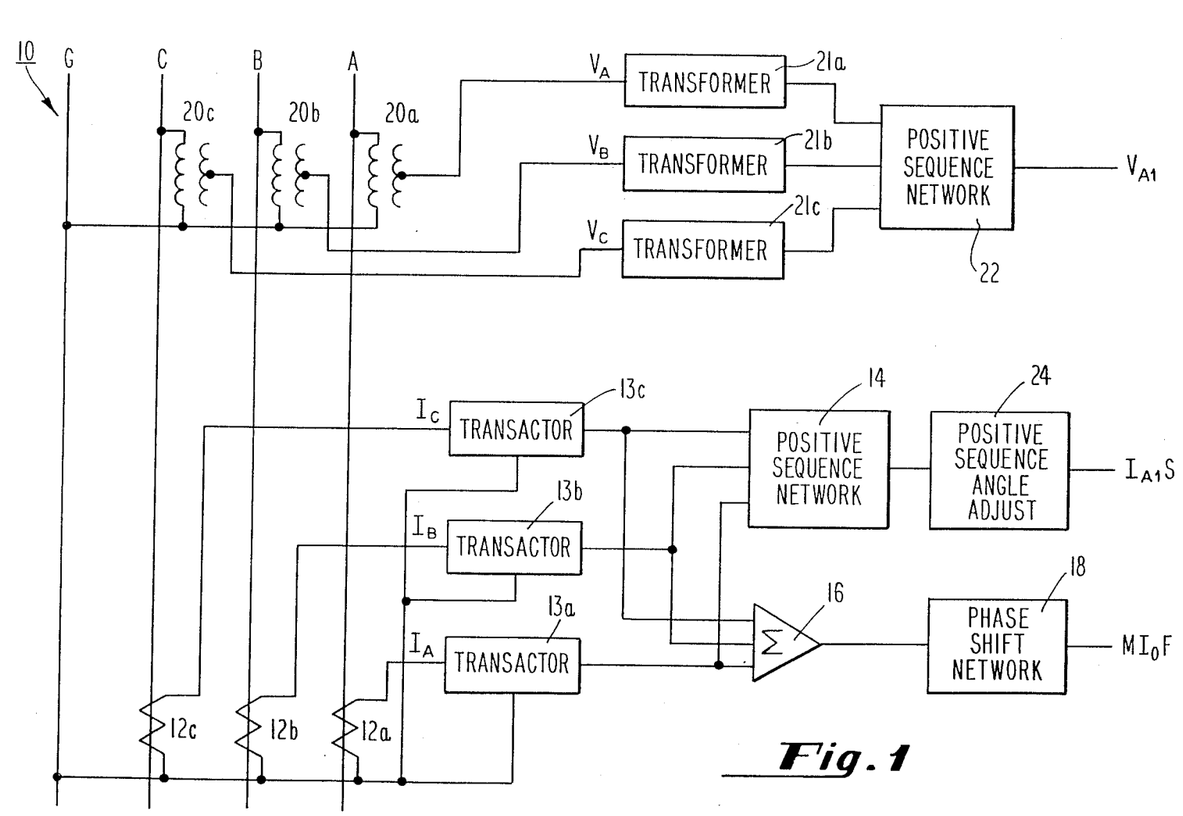
FIG. 1 is a one line, block diagram of a current and voltage processing portion of a preferred embodiment of the present invention.

Referring to FIG. 1, there is shown a three-phase alternating current electric power transmission line, generally designated 10, having an A phase (A), a B phase (B), a C phase (C) and ground (G). Each of the three phases have associated with it means 12 for sensing the current in that particular phase as well as means 20 for sensing voltage on that phase. As is well known to those skilled in the protective relaying and power transmission art, current sensing means 12 may be a current transformer and voltage sensing means 20 may be a step down potential transformer. As shown in FIG. 1, a current sensing means is associated with each phase; means 12a being associated with phase A, 12b being associated with phase B and 12c being associated with phase C. Likewise, there is a separate voltage sensing means 20a associated with phase A, means 20b associated with phase B and means 20c associated with phase C. However, it is to be understood that although a specific type of current and voltage sensing scheme is depicted in FIG. 1, other schemes known in the art may be substituted for that depicted; the purpose being to obtain signals which are related to each phase voltage and each phase current.

The output from the current sensing means 12a is coupled to a first transactor 13a; the output from current sensing means 12b is coupled to a second transactor 13b; and the output from the current sensing means 12c is coupled to a third transactor 13c. As is known in the art, the secondary voltage output of a transactor is related to the input current by a complex proportionality constant or a vector operator known as the transfer impedance of the transactor. For the transactors 13a, 13b and 13c shown in FIG. 1, the transfer impedance of each is selected to be equal to a fixed transfer ratio and a fixed angle, for example 85°. Consequently, the output of transactor 13a is a signal $I_{AT}$ which has, for example, a fixed 85° phase shift with respect to the input $I_A$. The output signals $I_{BT}$ and $I_{CT}$ from the transactors 13b and 13c respectively, are similarly related to their respective inputs $I_B$ and $I_C$. Further detailed descriptions of transactors may be had by reference to U.S. Pat. No. 3,374,399, issued to Dewey which patent is assigned to the assignee of the present invention and the teachings of which are incorporated by reference in this detailed description as if fully set forth herein.

The outputs of the transactors 13a, 13b, and 13c are coupled to the inputs of a first positive sequence network 14 and a first three-input summing amplifier 16. The summing amplifier 16 has an output which is equal to the sum of the inputs multiplied by a predetermined gain which, the preferred embodiment, is minus one-third. Consequently, the output of the summing amplifier 16 is equal to $MI_0$ where $I_0$ is the zero sequence component of the phase current in the transmission line and M indicates, in the convention used in this detailed description, that the signal is inverted. The output of the first three-input summing amplifier 16 is coupled to the input of a phase shift network 18. The output of the phase shift network 18 is the input signal which has been shifted in phase by a predetermined amount which, in the preferred embodiment, is 25 degrees lagging. Consequently, the output of the phase shift network 18 is the signal $MI_0F$ where F, in the convention used in this detailed description, indicates that the signal has been phase shifted.

The output of the voltage sensing means 20a is coupled to the primary of a first transformer 21a; the output of the voltage sensing means 14b is coupled to the primary of a second transformer 21b; and the output of the voltage sensing means 20c is coupled to the primary of a third transformer 21c. The signals from the secondaries of transformers 21a, 21b and 21c are coupled to the inputs of the second positive sequence network 22. It is well understood by those skilled in the art of electrical power transmission relaying that phase currents in a three-phase alternating current circuit can be resolved into three sets of symmetrical, balanced voltage and current vectors known as positive sequence, negative sequence and zero sequence components. It is also well known that certain circuits called "symmetrical component networks" can be connected to a three-phase electrical power system to provide an output signal that is proportional to the magnitude of the selected one of the three sequence components of voltage or current. The positive sequence networks 14 and 22 are such networks.

The positive sequence current and voltage networks also include a lagging phase shift network as described above for phase shift network 18 with the preferred phase shift of 25°. The output of the first positive sequence network 14 is the positive sequence component $I_{A1}$ of the current flowing in the A phase of the transmission line. The output of the second positive sequence network 22 is the positive sequence component $V_{A1}$ of the voltage in the A phase of the transmission line. Sequence networks of this type are disclosed in U.S. Pat. No. 4,342,062. Further detailed descriptions of symmetrical component networks can be had by reference to U.S. Pat. Nos. 3,992,651 issued to Hodges; and 4,034,269 issued to Wilkinson, both of which patents, as well as U.S. Pat. No. 4,342,062, are assigned to the assignee herein and the teachings of all are incorporated into this detailed description by reference as if fully set forth herein.

The output signal $I_{A1}$ is coupled to the input of a positive sequence angle adjust circuit 24. The output of the positive sequence angle adjust circuit 24 ($I_{A1}S$) is equal to the input signal ($I_{A1}$) having a preselected angle which, in the preferred embodiment, is in the range of from approximately 70 to 85 degrees. Consequently, the S in the expression $I_{A1}S$ indicates that, in the convention used herein, the positive sequence component of the phase A current has been adjusted to a predetermined angle. The angle adjust circuit 24 allows the relay replica impedance ($Z_R$) to be adjusted to the same impedance angle as the protected line.

Figure 2:
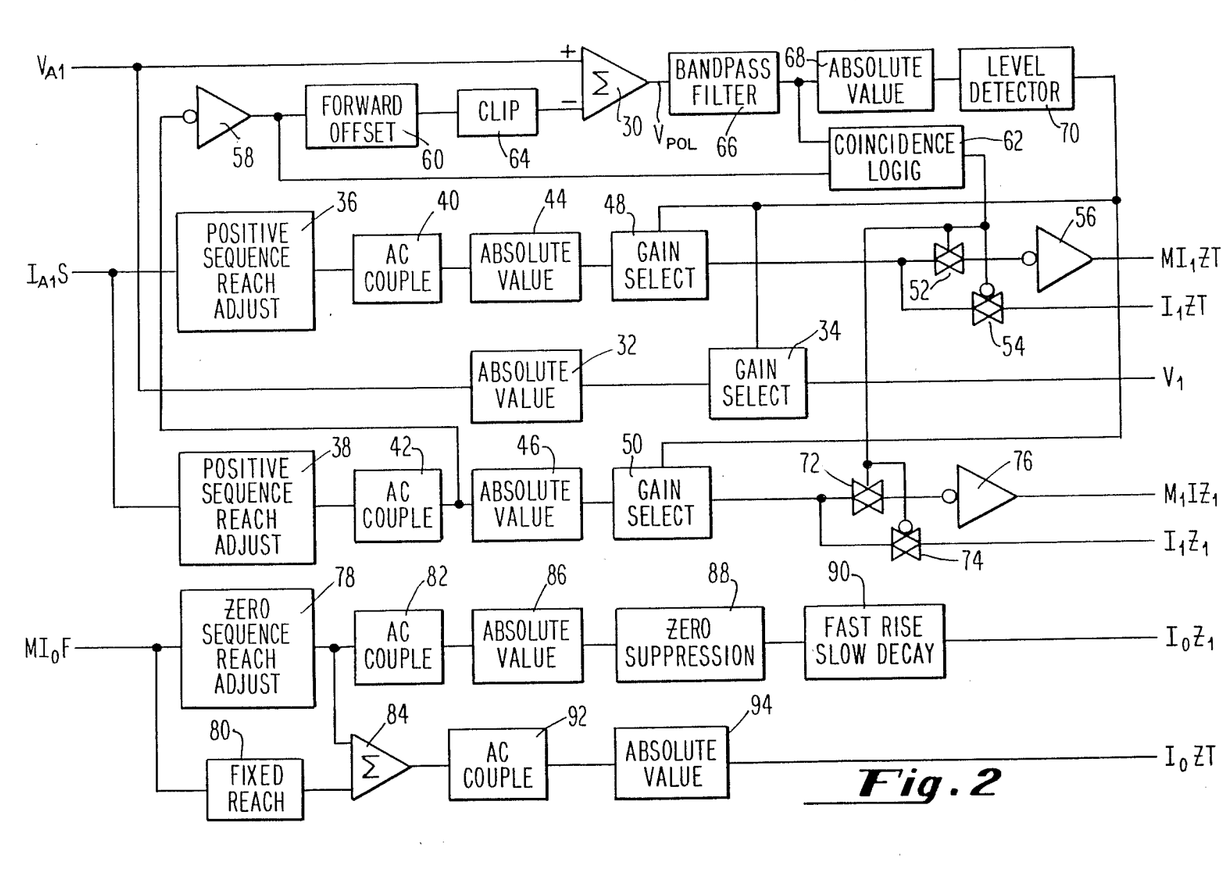
FIG. 2 is a block diagram of a reach adjustment and polarizing portion of the preferred embodiment of the present invention.

Referring now to FIG. 2, there is shown the reach adjustment and polarizing portion of the positive sequence distance relay of the present invention. The positive sequence component of the phase A voltage ($V_{A1}$), which has been obtained in accordance with the description set forth with reference to FIG. 1, is coupled to a non-inverting input of a first two-input summing amplifier 30 and the input of a first absolute value circuit 32. In the preferred embodiment, the first two-input summing amplifier 30 is an operational amplifier whose output is equal to the vector sum of the inverting and non-inverting inputs. In the preferred embodiment, each of the absolute value networks 32, 44, 46, 68 and 86 comprises a full wave precision rectifier of the type shown and described on pages 206 and 207 of the publication entitled "IC Op-Amp Cookbook", Second Edition, W. G. Jung, Howard Sams & Co., Inc. which is incorporated in the detailed description by reference as if fully set forth herein.

The output of the first absolute value network 32, which is substantially equal to the absolute value of the input signal, is coupled to the input of a first gain select circuit 34. The output of the first gain select circuit 34 has a magnitude which is selectable in accordance with a predetermined gain which is selectable by a "high" or "low" signal applied to a gain select input. In the preferred embodiment, the gain is either 1, selectable by application of a "high" signal to the gain select input, or, selectable by application of a "low" signal 0.4; consequently, the magnitude of the output is either equal to the magnitude of the input signal or is equal to 0.4 times the magnitude of the input signal depending upon the gain select control input.

The $I_{A1}S$ signal, which was generated in accordance with the description set forth with respect to FIG. 1, is coupled to the input of a first positive sequence reach adjust circuit 36 and a second positive sequence reach adjust circuit 38. The first 36 and the second 38 positive sequence reach adjust circuits are operational amplifier circuits having an adjustable gain. The output of the first positive sequence reach adjust circuit 36, which has an adjustable gain selected to provide the replica impedance magnitude for the overreaching zone of protection (ZT), is coupled to the input of a first AC couple circuit 40. The output of the second positive sequence reach adjust circuit 38, which has an adjustable gain selected to provide the replica impedance for zone one protection ($Z_1$), is coupled to the input of a second AC couple circuit 42. In the preferred embodiment, the first 40 and second 42 AC couple circuits comprise non-inverting operational amplifier circuits which have a gain of one for 60 HZ signals but have a gain of zero for any dc component in the input signal.

The output of the first 40 and second 42 AC couple circuits, each of which is equal to the input but with any dc component removed, are coupled to the inputs of a second 44 and third 46 absolute value network respectively. The outputs of the second 44 and third 46 absolute value networks are respectively coupled to the inputs of a second 48 and third 50 gain select networks. In the preferred embodiment, the second 48 and third 50 gain select networks are of the same type as the first gain select network 34 having a selectable gain which is, in the preferred embodiment is the same as the first gain select network 34.

The output of the second gain select network 48 is coupled to the input of a first electronic switch 52 and a second electronic switch 54. In the preferred embodiment, the electronic switches 52 and 54 are each controlled by a signal applied to a control input. Application of a control signal to the control input will operate the switch thereby connecting the signal applied to the input of the switch directly to the output. With respect to the first electronic switch 52, a "high" signal applied to the control input will connect the input of the switch to the output. With respect to the second electronic switch 54, a "low" input applied to the control input will cause the input of the electronic switch to be connected to the output.

The output of the first electronic switch 52 is coupled to the input of the first inverter 56. The first inverter 56 is preferably an operational amplifier having an inverting input and an output which is substantially equal to the inverted input signal. Consequently, the output of the first inverter 56 is a signal $MI_1ZT$ which is the inverse of the output $I_1ZT$ of the second electronic switch 54.

The output of the second AC couple circuit 42 is also connected to the input of a second inverter 58. The second inverter 58 is preferably an operational amplifier whose output is the inverse of the input. The output of the second inverter 58 is coupled to the input of a forward offset circuit 60 and one input of a two-input coincidence logic circuit 62. In the preferred embodiment, the forward offset circuit is an operational amplifier circuit with an adjustable gain selectable between 0 and 0.4. The output of the forward offset circuit 60, which is a selectable portion of the zone 1 reach magnitude (Z) multiplied by the phase shifted positive sequence current ($I_{A1}S$) is coupled to the input of a clip circuit 64. In the preferred embodiment, the clip circuit 64 comprises a zero suppression circuit which passes that portion of the input signal which is greater than a preset level, and a differential amplifier which subtracts the output of the zero suppression network from the input signal. Consequently, the output signal of the clip circuit 64 comprises only that portion of the input signal that is less than the preset level. In the preferred embodiment, the clip circuit 64 is of the type shown and described under the heading "BOUNDS" of a publication entitled "Nonlinear Circuits Handbook", edited by Daniel H. Sheingold, published 1974 by Analog Devices Inc., Norwood, Mass, which publication is incorporated in this detailed description as if fully set forth herein. The output of the clip circuit 64 is coupled to an inverting input of the first two-input summing amplifier 30.

The output of the first two-input summing amplifier 30, which as previously stated is the algebraic sum of the inverting and non-inverting inputs, is coupled to the input of a band pass filter 66. In the preferred embodiment, the band pass filter 66 has a center frequency equal to the nominal power system frequency typically 50 HZ or 60 HZ. and a Q of approximately 3.8. The output of the band pass filter 66 is coupled to the input of a fourth absolute value network 68 and the second input of the two-input coincidence logic circuit 62. In the preferred embodiment, the fourth absolute value circuit 68 is of the type previously described with respect to the first 32, second 44, and third 46 absolute value networks.

The output of the fourth absolute value network 68, which is the absolute value of the input, is coupled to the input of a level detector 70. The output of the level detector 70, which is a signal generated when the input exceeds a predetermined level which is, in the preferred embodiment 0.35 per unit, is coupled to the gain control inputs of the first 34, second 48 and third 50 gain select networks. An output signal from the level detector 70 causes the first, second and third gain selector networks to apply the high gain to the input signals of the circuits. With no output from the level detector 70, the first, second and third gain select networks will apply the low gain to the input signals.

The output of the third gain select network 50 coupled to the input of a third electronic switch 72 and a fourth electronic switch 74. The third 72 and fourth 74 electronic switches are of the type described previously with respect to the first 52 and second 54 electronic switches. The third electronic switch 72 will cause the signal applied to its input to be connected to its output upon application of a high signal to the control input; whereas the fourth electronic switch 74 will connect the signal applied to its input to its output upon application of a low signal to the control input. The output of third electronic switch 72 is coupled to the input of a third inverter 76. The third inverter 76 is preferably an operational amplifier whose output is the inverse of the input. The output of the coincidence logic 62, which is a high signal during coincidence of the two inputs, is coupled to the control inputs of the first 52, second 54, third 72 and fourth 74 electronic switches. Consequently, the output of the third inverter 76 is a signal $MI_1Z_1$ which is the inverse of the output $I_1Z_1$ of the fourth electronic switch 74.

The $MI_0F$ signal, which was generated as described with respect to FIG. 1, is coupled to the input of a zero sequence reach adjust network 78 and the input of a fixed reach network 80. In the preferred embodiment, the zero sequence reach adjust network 78 is the same design as the previously described positive sequence reach adjust networks 36 and 38. The output of the zero sequence reach adjust network 78, which has an adjustable gain selected to provide the replica impedance magnitude for the first zone of the protective zone, is coupled to a third AC couple network 82. In the preferred embodiment, the third AC couple network 82 is of the type described with respect to the first 40 and second 42 AC couple networks. The output of the zero sequence reach adjust network 78 is also coupled to one input of a second two-input summing amplifier 84. In the preferred embodiment, the second two-input summing amplifier 84 is preferably an operational amplifier whose output signal has a magnitude which is equal to the sum of the magnitude of the signals applied at the first and second inputs.

The output of the second AC couple network 82 is coupled to the input of a fifth absolute value network 86. In the preferred embodiment, the fifth absolute value network 86 is of the type described with respect to the first, 32, second, 44, third, 46, and fourth, 68 absolute value networks. The output of the fifth absolute value network 86, which has a magnitude which is the absolute value of the magnitude of the input signal, is coupled to the input of a zero suppression network 88. In the preferred embodiment, the zero suppression network 88 comprises a circuit which removes that portion of the input signal that is less than a preset level. Consequently, the output signal of the zero suppression network 88 comprises only that portion of the input signal which is greater than the preset level. In the preferred embodiment, the zero suppression network 88 is of the type shown and described under the heading "DEAD ZONE" on pages 25-26 of the aforementioned "Nonlinear Circuits Handbook" previously incorporated into this detailed description by reference. The output of the zero suppression network 88 is coupled to the input of a fast rise, slow decay circuit 90. The fast rise, slow decay circuit 90 is preferably an operational amplifier circuit with a dual time constant: a short time constant on the application of an input signal and a long time constant on the removal of the input signal. The output $I_0Z_1$ of the fast rise, slow decay circuit 90 is a signal which decays with a long time constant following the removal of the input signal to the circuit 90.

The output of the second two-input summing amplifier 84, which has a magnitude substantially equal to the sum of the outputs from the zero sequence reach adjust network 78 and the fixed reach network 80 as previously described, is coupled to the input of a fourth AC couple circuit 92. In the preferred embodiment, the fourth AC couple circuit 92 is of the type previously described with respect to the first, 40, second, 42, and third, 82 AC couple circuits. The output of the fourth AC couple circuit 92 is coupled to the input of a sixth absolute value network 94. The sixth absolute value network 94 is of the type previously described with respect to the first, 32, second, 44, third, 46, fourth, 68, and fifth, 86 absolute value networks. The output of the sixth absolute value network $I_0ZT$, is a signal having a magnitude which is the absolute value of the magnitude of the input signal as previously described.

Figure 3:
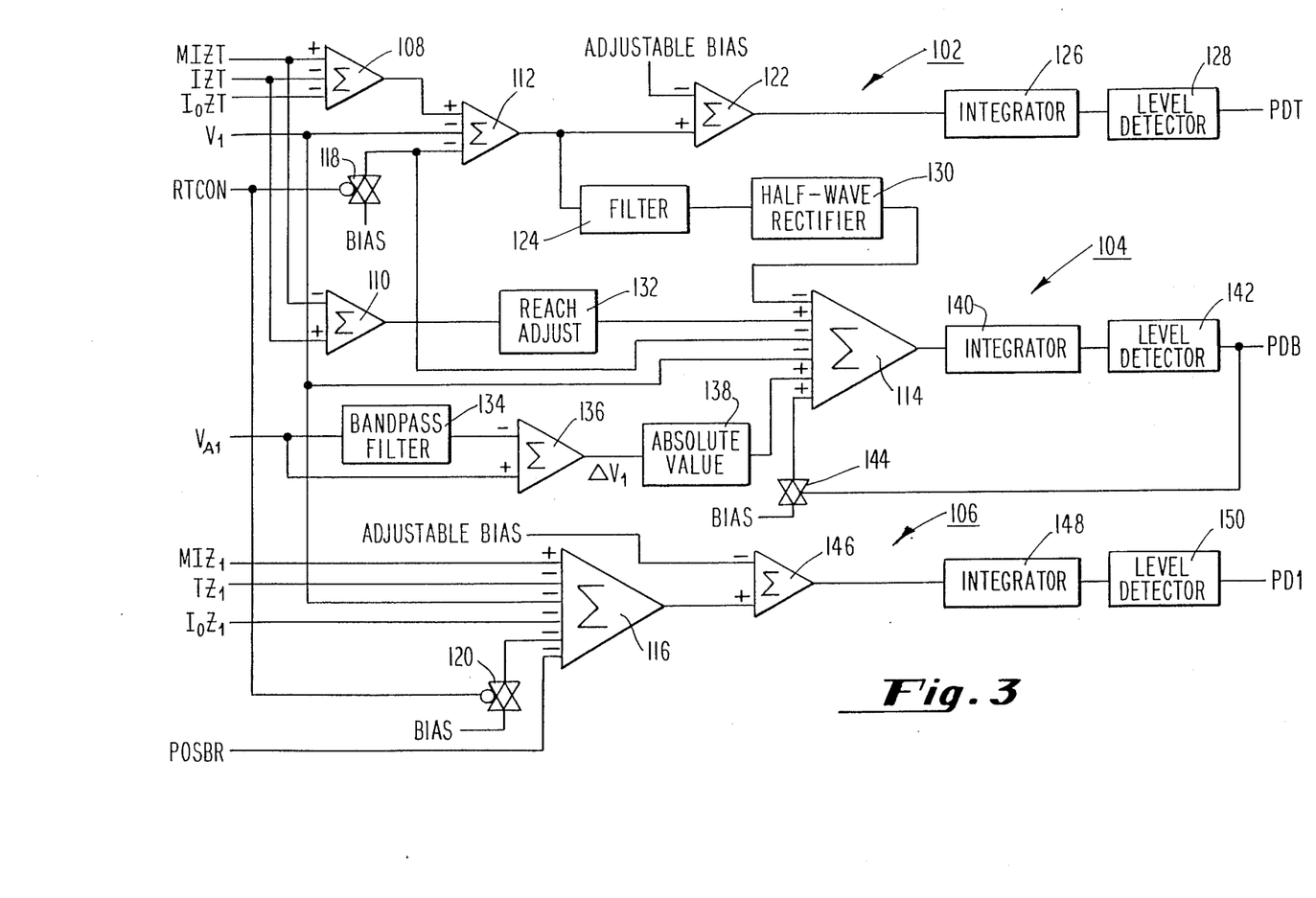
FIG. 3 is a block diagram of positive sequence units in accordance with a preferred embodiment of the present invention.

Referring now to FIG. 3, there is shown a block diagram of a tripping positive sequence unit, generally designated 102; a blocking positive sequence unit, generally designated 104; and a first zone positive sequence unit, generally designated 106. The MIZT signal, which was generated as described with respect to FIG. 2, is coupled to a non-inverting input of a second three-input summing amplifier 108 of the positive sequence trip relay 102 and an inverting input of a third two-input summing amplifier 110 of the positive sequence blocking relay 104. The signal IZT generated as described with respect to FIG. 2 is coupled to an inverting input of the second three-input summing amplifier 108 and a non-inverting input of the third two-input summing amplifier 110. The $I_0ZT$ signal, generated as previously described with respect to FIG. 2, is coupled to an inverting input of the second three-input summing amplifier 108.

The output of the second three-input summing amplifier 108, which is a signal having a magnitude equal to the algebraic sum of the inverting and non-inverting inputs, is coupled to a non-inverting input of a third three-input summing amplifier 112. The signal $V_1$, which is generated as described with respect to FIG. 2, is coupled to an inverting input of the third three-input summing amplifier 112; an inverting input of a first six-input summing amplifier 114 of the positive sequence blocking relay 104; and an inverting input of a second six-input summing amplifier 116 of the positive sequence zone one relay 106. A bias signal is coupled to an inverting input of the third three-input summing amplifier 112 and an inverting input of the first six-input summing amplifier 114 through a fifth electronic switch 118. The fifth electronic switch 118 is of the type described with respect to the second electronic switch 54 and fourth electronic switch 74 in that a low signal applied to the control input will cause the signal at the input of the switch to be connected to its output.

A restraint control signal (RTCON), which is generated to switch out restraint in the positive sequence units 102, 104 and 106, for reasons which will be subsequently described, is coupled to the control input of the fifth electronic switch 118 and the control input of a sixth electronic switch 120. The sixth electronic switch 120 is preferably of the type described with respect to the second electronic switch 54, the fourth electronic switch 74 and the fifth electronic switch 118 in that a low signal applied to the control input will cause the signal appearing at the input of the switch to be switched to its output. As shown in FIG. 3, a bias signal is coupled to an inverting input of the second six-input summing amplifier 116 through the sixth electronic switch 120.

Figure 5:
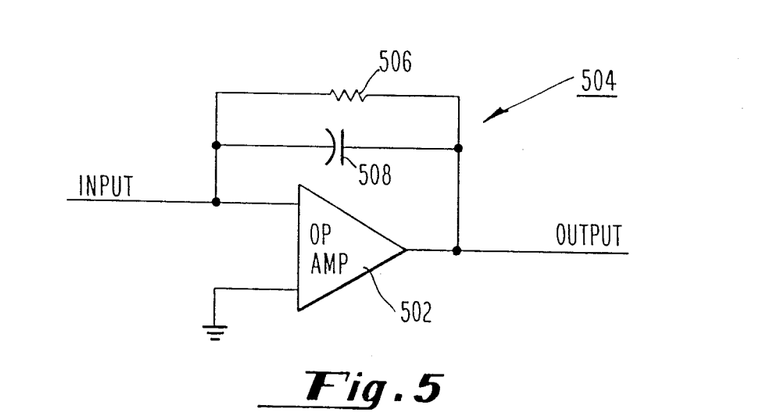
FIG. 5 is a block diagram of a preferred embodiment of an integrator for use in the present invention.

The output of the third three-input summing amplifier 112, which, as previously described, is a signal having a magnitude which is equal to the algebraic sum of the magnitudes of the signals coupled to the inverting and non-inverting inputs, is coupled to a non-inverting input of a fourth two-input summing amplifier 122 and the input of a first filter 124. A bias signal, having an adjustable magnitude, is applied to an inverting input of the fourth two-input summing amplifier 122. The output of the fourth two-input summing amplifier 122, which is a signal having a magnitude equal to the algebraic sum of the inverting and non-inverting inputs, is coupled to the input of a first "integrator" circuit 126. In the preferred embodiment, the first "integrator" circuit 126 comprises, as shown in FIG. 5, an operational amplifier 502 having a feedback circuit, generally designated 504, connected between its output and its input. The feedback circuit 504 comprises a resistor 506 and a capacitor 508 connected in parallel. The input to the "integrator" circuit 126 is the input to the operational amplifier 502; and the output of the "integrator" circuit 126 is the output of the operational amplifier 502.

The output of the first "integrator" circuit 126, is coupled to the input of a second level detector 128. In the preferred embodiment, the second level detector 128 is of the type described with respect to the first level detector 70 in which the output is a signal (PDT) which is generated when the input of the second level detector 128 exceeds a predetermined value. In the preferred embodiment, this predetermined level is equal to 60 mv to provide a threshold to overcome extraneous signals. The PDT signal is utilized in the system as a circuit breaker trip signal.

In the preferred embodiment, the filter 124 is a simple R-C filter followed by an operational amplifier buffer. The output of filter 124, which is essentially equal to the input of the filter except that the magnitude of any high frequency components has been reduced, is applied to the input of a half-wave rectifier 130. The output of the half-wave rectifier, which is a signal comprising only the positive half-wave portions of the input signal, is coupled to an inverting input of the first six-input summing amplifier 114.

The output of the third two-input summing amplifier 110, which was previously described is a signal having a magnitude which is the algebraic sum of the magnitude of the signals applied to the inverting and non-inverting inputs, is coupled to a reach adjustment network 132. In the preferred embodiment, the reach adjustment network 132 is an operational amplifier with adjustable gain, having a gain range of 0.5 to 2.25. The output of the reach adjust network 132 which has been adjusted in magnitude to provide the proper replica impedance reach for the blocking zone of protection, is coupled to a non-inverting input of the first six-input summing amplifier 114.

The $V_{A1}$ signal, generated as described with respect to FIG. 1, is coupled to the input of a second band pass filter 134 and a non-inverting input of a fifth two-input summing amplifier 136. In the preferred embodiment, the second band pass filter 134 is a multiple feed back band pass filter with the center frequency selected equal to the rated frequency of the power system, which frequency is typically 50 Hz or 60 Hz, and connected to an inverting input of a fifth two-input summing amplifier 136. The second band pass filter 134 preferably has a Q approximately equal to two and a gain of one. With a Q of two, a change in the output signal from the band pass filter 134 lags a corresponding change in the input thereby providing short term memory of the pre-change signal. Although a higher Q would provide a longer time constant and a longer term memory, it would create greater phase variation upon occurrence of a change in frequency, which could cause generation of a signal from the fifth two-input summing amplifier 136 yo which the output of the second band pass filter 134 is coupled. Such a signal could create erroneous operation of the relay since it could be generated as a result of an expected variation in frequency and not as a result of a fault.

The output of the fitth two-input summing ampolifier 136 is a signal $\Delta V_1$ having a magnitude which is the algebraic sum of the inverting and non-inverting inputs of the amplifier 136. Due to the short term memory of the band pass filter 134, as previously described, immediately following occurrence of a fault, the output signal $\Delta V_1$ from the amplifier 136 is initially equal to the postfault positive sequence component of the voltage minus the pre-fault positive sequence component of the voltage or the change in the positive sequence component of the voltage which is attributable to the fault. The signal $\Delta V_1$ is coupled to the input of a seventh absolute value network 138 which is of the type previously described with respect to the first, 32, second, 44, third, 46, fourth, 68, fifth, 86, and sixth, 94 absolute value networks. The output of the seventh absolute value network 138 is a signal whose magnitude is the absolute value of the magnitude of the input signal and is coupled to a non-inverting input of the first six-input summing amplifier 114.

The output of the first six-input summing amplifier 114 is coupled to the input of a second "integrator" circuit 140. The second "integrator" circuit 140 is of the type described with respect to the first "integrator" circuit 126 as depicted in FIG. 5. The output of the second "integrator" circuit 140 is coupled to a third level detector 142. In the preferred embodiment, the third level detector 142 is the same type as the previously described second level detector 128. The output of the third level detector 142 is a blocking signal (PDB) which is generated when the input of the third level detector 142 exceeds a predetermined level, which, in the preferred embodiment, is 30 mv to provide a threshold to overcome extraneous signals. The PDB signal is used to block generation of a tripping signal as will be subsequently described. The output of the second level detector 142 is also coupled to the control input of a seventh electronic switch 144. The seventh electronic switch 144 is of the type described with respect to the first 52 and third 72 electronic switches in that a high signal applied to the control input causes the signal at the input of the switch to be connected to its output. A bias signal is coupled to a non-inverting input of the first six-input summing amplifier 114 through the sixth electronic switch 144.

The $MIZ_1$ signal, which was generated as described with respect to FIG. 2, is coupled to a non-inverting input of the second six-input summing ampolifier 116. The $IZ_1$ signal, which is generated as described with respect to FIG. 2, is coupled to an inverting input of the second six-input summing amplifier 116. The $I_0Z_1$ signal, which is generated as described with respect to FIG. 2, is coupled to an inverting input of the second six-input summing amplifier 116. An out-of-step blocking signal (POSBR) is generated by an out-of-step blocking relay of the type shown and described in my co-pending U.S. patent application Ser. No. 120,149 which is entitled "Out-of-Step Blocking Unit"; which is filed concurrently herewith; which is assigned to the assignee of the present application and which is incorporated by reference in this detailed description as if fully set forth herein. The out-of-step blocking signal POSBR is applied to an inverting input of the second six-input summing amplifier 116.

The output of the second six-input summing amplifier 116 is coupled to an non-inverting input of a sixth two-input summing amplifier 146. A bias signal having an adjustable magnitude is coupled to an inverting input of the sixth two-input summing amplifier 146. The output of the sixth two-input summing amplifier 146, which is a signal having a magnitude which is substantially equal to the algebraic sum of the magnitude of the signal applied to the inverting and non-inverting inputs, is coupled to the input of a third "integrator" circuit 148. The third "integrator" circuit 148 is the same type as the previously described first "integrator" circuit 126 as depicted in FIG. 5.

The output of the third "integrator" circuit 148 is coupled to the input of a fourth level detector 150. The fourth level detector 150 is the same type as the previously described second level detector 128. The fourth level detector 150 provides an output signal (PD1) when the magnitude of the input signal exceeds a predetermined level which, in the preferred embodiment, is 300 mv to provide a threshold to overcome extraneous signals. The PD1 signal is utilized in the system as a circuit breaker trip signal.

The positive sequence distance relay of the present invention operates as follows. Assuming the normal situation where there are no faults on the AC electrical power transmission line, the $MI_0F$, $I_0Z_1$ and $I_0ZT$ signals are essentially equal to zero because under normal load conditions the phase currents are balanced and the zero sequence current ($I_o$) is substantially equal to zero. The $\Delta V_1$ signal is also essentially equal to zero as there is no change in the positive sequence voltage during normal load conditions. The RTCON signal is at a logic zero and therefore restraint bias is being supplied to the summing amplifiers 112, 114, and 116 via switches 118 and 120. The magnitude of the $I_{A1}S$ signal is proportional to the magnitude of the positive sequence load current on the protected system. The $I_{A1}S$ signal leads the $V_{A1}$ signal by approximately the replica impedance angle since the positive sequence voltage and current on the protected system are substantially in phase for a normal load condition. Because the $V_{A1}$ and $I_{A1}S$ signals are substantially 90° out of phase, the coincidence logic circuit, 62, switches MIZT and $MIZ_1$ for 90° and IZT and $IZ_1$ for the second 90°. The net inputs to the integrators 126, 140 and 148 are in the restraint direction and there is no output from the level detectors 128, 142 and 150.

Assuming now a single phase fault within zone one of the protected region. During the fault condition, the positive sequence voltage and current on the system are substantially out of phase by the transmission line impedance angle with the voltage leading the current. Thus, the signals $V_1$ and $I_{A1}S$ are substantially in phase and the coincidence logic output causes the MIZT, and $MIZ_1$ signals to be switched into their respective circuits while the IZT and $IZ_1$ signals are substantially equal to zero. Thus, an operate signal is applied to the summing stages 108 and 116. The associated fault detector operates causing the RTCON signal to go to a logic one and thereby remove the bias signals from the summing amplifiers 112, 114, and 116. During a single line to ground fault an unbalance exists in the currents in the protected transmission system which causes a zero sequence current to be produced by the summing amplifier 16. This zero sequence current signal in turn produces the signals $I_0ZT$ and $I_0Z_1$, which provide restraint signals to the summing amplifiers 108 and 116. These added restraint signals prevents the PDT and PD1 units from operating on single line to ground faults.

Assuming now there is a three-phase fault within zone one of the protected region. During the fault condition, the positive sequence voltage and current on the system are substantially out of phase by the transmission line impedance angle with the voltage leading the current. Thus, the signals $V_1$ and $I_{A1}S$ are substantially in phase and the coincidence logic output causes the MIZT, and $MIZ_1$ signals to be switched into their respective circuits while the IZT and $IZ_1$ signals are substantially equal to zero. Thus an operate signal is applied to the summing stages 108 and 116. The associated fault detector operates causing the RTCON signal to go to a logic one and thereby remove the bias signals from the summing amplifiers 112, 114, and 116. During a three phase fault no substantial unbalance exists in the currents in the protected transmission line; therefore there is essentially no zero sequence current and the signals $I_0ZT$ and $I_0Z_1$ are substantially zero. For a fault within the zone one relay reach, the magnitude of the MIZ$_1$ signal is larger than the magnitude of the V$_1$ restraint signal and the net input into the PD1 integrator 148 is in the operate direction. When the level of the integrator output is greater than the level detector setting a PD1 output will be produced. Because the reach of the Zone 1 unit is always less than the reach of the overreaching unit, the PDT will also produce an output for this fault.

Assuming now there is a three phase fault in the reverse direction (behind) the relay. During the fault condition, the positive sequence voltage and current on the system are substantially out of phase by the transmission line impedance angle with the voltage lagging the current. Thus the signals V$_1$ and I$_{41}$S are substantially 180° out of phase and coincidence logic output causes the IZT, and IZ$_1$ signals to be switched into their respective circuits while the MIZT and MIZ$_1$ signals are substantially equal to zero. Thus an operate signal is applied to the summing stage 110. The associated fault detector operates causing the RTCON signal to go to a logic one and thereby remove the bias signals from the summing amplifiers 112, 114, and 116. During a three phase fault no substantial unbalance exists in the currents in the protected transmission line and therefore there is essentially no zero sequence current and the signals I$_o$ZT and I$_o$Z$_1$ are substantially zero. For a fault within the blocking unit reach, the magnitude of the IZT signal is larger than the magnitude of the V$_1$ restraint signal and the net input to the PDB integrator 140 is in the operate direction. When the level of the integrator output is greater than the level detector setting, a PDB output is produced. An additional operate signal is applied to the summing amplifier 114 by the $\Delta$V$_1$ signal on the occurrence of a fault. This signal insures fast operation even on some external faults where the magnitude of the IZT operate signal may be small. After the PDB unit operates, an additional operate bias signal is added in via switch 144 to ensure a continuous blocking signal for external faults.

Finally, it is assumed that there is a three-phase fault in the forward direction beyond the first zone but within the reach of the overreaching relay, PDT. During the fault condition, the positive sequence voltage and current on the system are substantially out of phase by the transmission line impedance angle with the voltage leaing the current. Thus, the signals V$_1$ and I$_{41}$S are substantially in phase and coincidence logic output causes the MIZT, and MIZ$_1$ signals to be switched into their respective circuits while the IZT and IZ$_1$ signals are substantially equal to zero. Thus an operate signal is applied to the summing stages 108 and 116. The associated fault detector operates causing the RTCON signal to go to a logic one and thereby remove the bias signals from the summing amplifiers 112, 114, and 116. During a three phase fault no substantial unbalance exists in the currents in the protected transmission line; therefore there is essentially no zero sequence current and the signals I$_o$ZT and I$_o$Z$_1$ are substantially zero. For a fault within the overreaching relay reach, the magnitude of the MIZT signal is larger than the magnitude of the V$_1$ restraint signal and the net input into the PDT integrator 126 is in the operate direction. When the level of the integrator output is greater than the level detector setting a PDT output will be produced. Because the assumed fault was beyond the zone one reach, the MIZ$_1$ signal will be less than the V$_1$ restraint signal and the net signal into the PD1 integrator 148 will be in the nonoperate direction, thereby preventing a PD1 output.

Use of an integrator and level detector combination for the positive sequence distance units has a number of advantages over the prior art phase angle comparator type units. Among these advantages are enhanced speed of operation for close-in severe faults. The speed of the relay system is primarily predicated on the need to prevent false tripping due to the transient overreach attributable to CCVT transient errors. One solution with phase angle comparators is to provide a fixed time delay that will override the maximum period that the CCVT transient can appear as a net operating signal. Other phase angle comparator type relays use a filter delay plus a fixed operating time imposed by the characteristic timer. The relay of the present invention substantially eliminates the fixed operating time associated with a characteristic timer, thereby permitting operating times in the order of two to three milliseconds for close-in severe faults that will be most critical to system stability.

The operating time of the integrator level detector approach of the present invention can be estimated by:

$$t = T_{RC} \ln[(|V_R| + |V_{OP}|)/|V_{OP}|]$$

where:
V$_R$ equals the prefault restraint voltage.
V$_{OP}$ equals the magnitude of (I$_{fault}$Z$_{relay}$ − V).
T$_{RC}$ equals the time constant of the integrator.
ln indicates natural log.

For example, in a distance unit where the restraint is limited to 0.5 per unit, T$_{RC}$ is 10 milliseconds, and the value of IZ − V is 1.5 per unit, the operating time will be approximately 2.9 milliseconds. The calculation assumes an average value of IZ − V. There will be a minor variation in operating time based on fault incidence angle, and there is a small filter delay in a low-pass filter incorporated in the positive sequence networks.

Another advantage of the integrator/level detector approach of the present invention is the facility with which the relay unit can be modified to enhance the overall performance of the relay scheme. One example is the simple addition of a I$_0$Z$_{R1}$ restraint signal in a single pole tripping and closing scheme. The I$_0$Z$_{R1}$ restraint blocks the positive sequence distance unit from operating on single line to ground faults thus permitting the unit to initiate a three pole trip directly on interphase faults. The use of the integrator/level detector approach of the present invention also adds to the security of the systen as compared to prior art systems. The integrator/level detector combination will result in comparatively longer operating times on remote external faults. This increase in security is the probability that the external fault will be cleared before the relay can operate thus diminishing the possibility of a misoperation where a false channel operation might occur during the fault.

Figure 4:
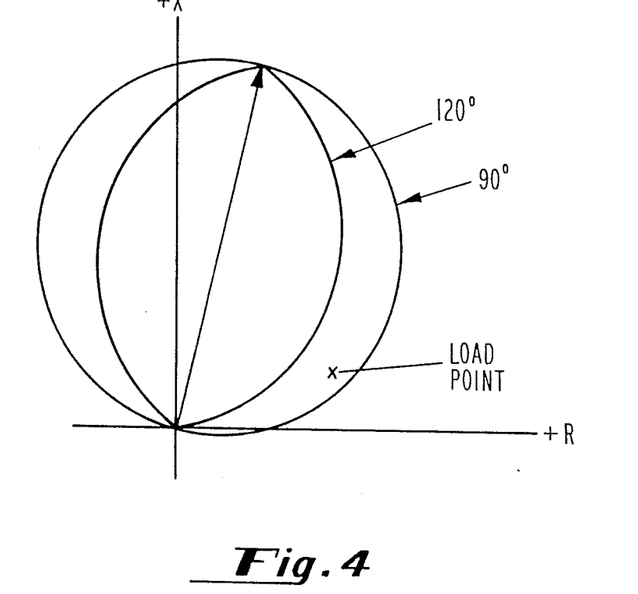
FIG. 4 is a R-X diagram depicting a mho/lens characteristic of a positive sequence distance relay in accordance with the present invention.

As is known, the steady state coverage on the R-X diagram for positive sequence distance units must be restricted to prevent operation of the unit from maximum load flow. In the prior art schemes, the characteristic timer setting, associated with the phase angle comparator, is increased to produce a lens characteristic which moves the characteristic away from the maximum load impedance point as illustrated in FIG. 4. The penalty incurred is an increase in the operating time of the unit. In the present invention, employing an integrator/level detector scheme, and utilizing the positive concidence of V$_{POL}$ and I$_1$Z$_R$ as an operating signal, the negative coincidence of $V_{POL}$ and $I_1Z_R$ as one restraint with increased weighting compared to the positive coincidence, and $V_1$ as a second restraint to obtain a lenticular characteristic, results in little or no increase in operating time. However, for very heavy load flow, it may be necessary to increase the time constant of the associated integrator which will produce increase in operating time.

A portion of the integration signal in the POSB out-of-step blocking relay is used as a restraint input into the PD1 relay. This additional restraint, after the inherent delays in the operation of POSB, increases the security of the PD1 relay on the transients associated with clearing an external fault just beyond the zone of the PD1 relay.

As can be seen from the above detailed description, the present invention provides a positive sequence distance relay which has enhanced operating time based upon fault severity and which operates more quickly for close-in fault as compared to a remote end fault in the protected zone. The distance relay of the present invention also has improved discrimination between internal and external faults thereby increasing the reliability of the relay operation and the security of the protection system. It also has improved discrimination between internal and external faults on series capacitive compensated AC power transmission lines.

While the present invention has been described with reference to a specific embodiment thereof, it will be obvious to those skilled in the art that various changes and modifications may be made without departing from the invention in its broader aspects. It is contemplated in the appended claims to cover all variations and modifications of the invention that come within the true spirit and scope of my invention.

What is claimed is:

1. In a protective relay for detecting faults within a predetermined overreach zone of a three phase power transmission line of an electrical power distribution system, means for generating at least one relay output signal, said means comprising:
   (a) means for receiving signals from the three phase power transmission line, which signals relate to the three phase voltages and current;
   (b) means for utilizing said signals relating to the three phase voltages and currents for generating at least one operate signal having a first polarity and at least one restraint signal having second polarity opposite said first polarity, said means for generating said at least one operate signal and said at least one restraint signal comprising:
      (i) means for generating a signal $V_1$ related to a positive sequence component of a phase voltage;
      (ii) means for generating a polarizing signal $V_{pol}$ related to said $V_1$ signal;
      (iii) means for generating a signal $I_1Z_1$ comprising a signal $I_1$ related to a positive sequence component of a phase current multiplied by a quantity $Z_1$, which corresponds to a replica impedance of a first protective zone of said power transmission line; and
      (iv) means for comparing coincidence of said $V_{pol}$ and $I_1Z_1$ signals and generating at least a first operate signal $MI_1ZT$ related to a first polarity of said $I_1$ signal multiplied by a quantity related to a replica impedance $ZT$ of an overreach protected zone of said power transmission line, during coincidence of said $V_{pol}$ and $I_1Z_1$ signals, and generating at least a first restraint signal $I_1ZT$ related to said $I_1$ signal multiplied by said overreach replica impedance $Zt$, said first restraint signal having a second polarity opposite said first polarity when $V_{pol}$ and $I_1Z_1$ are not coincident;
   (c) at least a first summing circuit means for producing an output signal having a polarity and a magnitude which are related to the algebraic sum of the magnitude of said at least one operate signal and said at least one restraint signal coupled to the inputs of said summing circuit means, said at least one operate signal comprising said $MI_1ZT$ signal and said at least one restraint signal comprising said $I_1ZT$ signal and said $V_1$ signal;
   (d) at least a first integrator circuit means comprising an operational amplifier having an input adapted to receive said output signal from said summing circuit means, an output, and a feedback circuit connected between said input and said output, said feedback circuit comprising resistance means and capacitance means electrically connected in parallel; and
   (e) at least a first level detector means for generating a relay output signal when an output signal from the output of said operational amplifier is of said first polarity and has a magnitude which exceeds a predetermined level, said relay output signal from said first level detector means comprising an overreach trip signal PDT indicating a fault has occurred in said predetermined overreach zone.

2. The protective relay in accordance with claim 1 wherein said means for generating said at least one operate signal and said at least one restraint signal additionally comprises:
   (a) means for generating a signal $I_1Z$ comprising said $I_1$ signal multiplied by a quantity $Z$ related to a predetermined portion of said replica impedance $Z_1$; and
   (b) means for generating a polarizing signal $V_{pol}$ related to the difference between said $V_1$ and $I_1Z$ signals.

3. The protective relay in accordance with claim 2 additionally adapted for detecting faults within a predetermined first zone portion of said overreach zone of said three phase power transmission line, said relay additionally comprising second summing circuit means, second integrator circuit means and second level detector means, wherein:
   (a) said means for comparing coincidence of said $V_{ppol}$ and $I_1Z_1$ signals generates a second operate signal $MI_1Z_1$ related to the first polarity of said $I_1$ signal multiplied by a quantity related to a replica impedance $Z_1$ of said first zone, during coincidence of said $V_{pol}$ and $I_1Z_1$ signals, and generating a second restraint signal $I_1Z_1$ related to said $I_1$ signal multiplied by said first zone replica impedance $Z_1$, said second restraint signal having said second polarity, when $V_{pol}$ and $I_1Z_1$ are not coincident; and
   (b) said relay output signal from said second level detector means comprises a first zone trip signal PD1 indicating a fault has occurred in said predetermined first zone.

4. The protective relay in accordance with claim 3 additionally adapted for generating a block signal PDB, said relay additionally comprising third summing circuit means, third integrator circuit means and third level detector means, wherein:

(a) said $MI_1ZT$ and said $I_1ZT$ signals, generated by said means for comparing coincidence of said $V_{pol}$ and $I_1Z_1$, signals are coupled to said third summing circuit means as a third restraint signal and a third operate signal respectively; and (b) said relay output signal from said third level detector means comprises said blocking signal PDB indicating that a fault has occurred outside said predetermined overreach zone.

5. The protective relay in accordance with claim 4 wherein the output signal of said first summing circuit means is coupled to an input of said third summing circuit means as a fourth restraint signal.

6. The protective relay in accordance with claim 5 additionally comprising means for increasing the magnitude of the $I_1ZT$, $MI_1ZT$, $I_1Z_1$ and $V_1$ signals from first levels to second, higher levels when the magnitude of the $V_{pol}$ signal exceeds a predetermined leve.

7. The protective relay in accordance with claim 6 wherein said $V_1$ singal is coupled to an input of each of said first, second and third summing circuit means as a fifth restraint signal.

8. The protective relay in accordance with claim 7 additionally comprising:

(a) means for generating a sixth restraint signal; and (b) means for coupling said sixth restraint signal to an input of each of said first, second and third summing circuit means during unfaulted conditions and removing said sixth restraint signal from said inputs when a fault occurs in said three phase power transmission line.

9. The protective relay in accordance with claim 8 additionally comprising:

(a) means for delaying said $V_1$ signal by a predetermined amount;

(b) means for producing a signal $V_1$ which is substantially equal to the $V_1$ signal minus the delayed $V_1$ signal; and (c) means for coupling said $V_1$ signal to an input of said third summing circuit means as a fourth operate signal.

10. The protective relay in accordance with claim 9 additionally comprising:

(a) means for generating a signal $I_oZT$ comprising a signal $I_o$ related to a zero sequence component of a phase current multiplied by said ZT replica impedance quantity; and (b) means for coupling said $I_oZT$ signal to an input of said first summing circuit means as a seventh restraint signal.

11. The protective relay in accordance with claim 10 additionally comprising:

(a) means for generating a signal $I_oZ_1$ comprising said $I_o$ signal multiplied by said $Z_1$ replica impedance quantity; and (b) means for coupling said $I_oZ_1$ signal to an input of said second summing circuit means as an eighth restraint signal.

12. The protective relay in accordance with claim 11 additionally comprising means for generating a fifth operate signal which is applied to an input of said third summing circuit means upon generating of said PDB signal.

13. The protective relay in accordance wit claim 12 additionally comprising:

(a) means for receiving an out-of-step blocking signal POSBR from an out-of-step blocking relay; and (b) means coupling said POSBR signal to an output of said second summing circuit means as a ninth restraint signal.

* * * * *

UNITED STATES PATENT AND TRADEMARK OFFICE
CERTIFICATE OF CORRECTION

PATENT NO. : 4,821,137
DATED : April 11, 1989
INVENTOR(S) : Stanley B. Wilkinson It is certified that error appears in the above-identified patent and that said Letters Patent is hereby corrected as shown below:

Column 1, line 33, delete the word "defects" and replace with the word --detects--.

Column 11, line 15, delete the number "30" and replace with the number --60--.

Column 11, line 68, delete the number "300" and replace with the number --60--.

Column 16, line 50, delete "$V_{ppol}$" and replace with --$V_{pol}$--.

Column 17, line 18, delete "leve" and replace with the word --level--.

Column 17, line 21, delete "singal" and replace with the word --signal--.

Column 18, line 1, insert the symbol --$\triangle$-- between "signal" and "$V_1$".

Column 18, line 4, insert the symbol --$\triangle$-- between "said" and "$V_1$".

UNITED STATES PATENT AND TRADEMARK OFFICE
CERTIFICATE OF CORRECTION

PATENT NO. : 4,821,137

DATED : April 11, 1989

INVENTOR(S) : Stanley B. Wilkinson

It is certified that error appears in the above-identified patent and that said Letters Patent is hereby corrected as shown below:

Column 18, line 29, delete "wit" and replace with the word --with--.

Signed and Sealed this

Seventeenth Day of September, 1991

Attest:

HARRY F. MANBECK, JR.

*Attesting Officer*  *Commissioner of Patents and Trademarks*